Patented Nov. 5, 1935

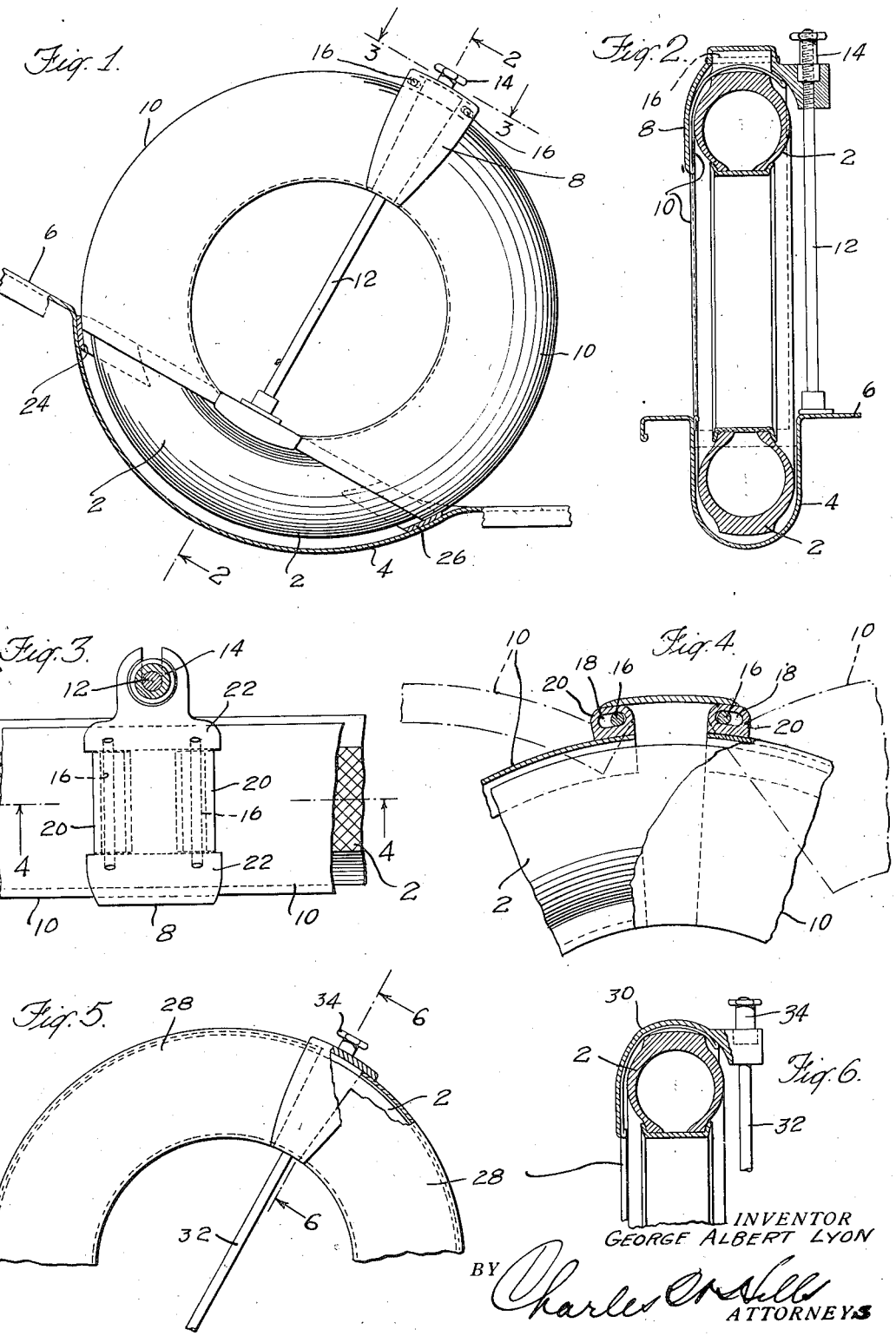

2,019,714

UNITED STATES PATENT OFFICE 2,019,714

TIRE COVER CONSTRUCTION

George Albert Lyon, Allenhurst, N. J., assignor to Lyon Incorporated, Asbury Park, N. J., a corporation of Delaware Application March 2, 1931, Serial No. 519,340

7 Claims. (Cl. 150—54)

This invention relates to devices for covering the spare tires of automobiles, and more particularly to spare tire covering devices of the type comprising an enclosing casing made of metal or other relatively stiff material.

The invention is particularly designed to be embodied in a construction for covering a tire supported in a well in the fender of an automobile.

Certain of the important objects of the invention are to improve the construction and mode of operation of devices of the above type for covering spare tires of automobiles, and to produce a novel and improved device which will provide a satisfactory cover of attractive appearance for a spare tire supported in a fender well, and which may be quickly and easily applied to, and removed from the tire.

Another important object of the invention is to produce a novel and improved construction for covering a tire supported in the fender well of an automobile, which will hold the tire securely in position in the well.

With these and other objects in view the invention consists in the novel and improved features, constructions and combinations of parts hereinafter described and particularly pointed out in the claims, the advantages of which will be readily understood and appreciated by those skilled in the art.

The invention will be clearly understood from the accompanying drawing illustrating the invention in its preferred form and the following detailed description of the constructions therein shown.

In the drawing, Fig. 1 is a view in side elevation partly in section, illustrating a construction embodying the invention;

Fig. 2 is a sectional view taken substantially on the line 2—2 of Fig. 1;

Fig. 3 is a detail sectional view taken substantially on the line 3—3 of Fig. 1;

Fig. 4 is a detail sectional view taken substantially on the line 4—4 of Fig. 3 with certain parts shown in elevation;

Fig. 5 is a view in side elevation partly in section, illustrating a modified construction; and Fig. 6 is a detail sectional view taken substantially on the line 6—6 of Fig. 5.

The invention is illustrated in this application as applied to a tire 2 engaging in a recess or well 4 in the fender 6 of an automobile. The structure illustrated serves the dual function of a "hold-down" device for holding the tire in the fender well, and a cover for the tire.

In the form of the invention shown in Figs. 1 to 4, inclusive, the construction comprises a supporting member or carrier 8 mounted for movement toward and from the fender well, and two arcuate tire cover members 10 pivotally mounted on said supporting member. As shown particularly in Fig. 2, the supporting member 8 is mounted on a rod 12 secured to the frame of the automobile in a position centrally of the fender well and extending obliquely upward from the well in a direction substantially parallel with the central plane of the tire. The supporting member is provided with an opening thru which the rod passes and said member is secured on the rod by means of a nut 14 threaded on the rod. The supporting member, as clearly shown in Fig. 2, is shaped to extend over the periphery of the tire and to project inwardly toward the axis of the tire or the outer side thereof.

Each of the sections 10 is arcuate in form and is shaped in cross section to cover a peripheral portion of the tire and to extend over the outer side wall of the tire. Each of these sections is made of relatively stiff sheet material and preferably consists of sheet metal shaped into the desired form. Each casing section is provided with a peripheral wall shaped to extend about the peripheral portion of the tire, and with a side wall extending inwardly toward the axis of the tire from said peripheral wall to cover the side wall of the tire. The peripheral wall of each section is concavo-convex in cross section to provide a recess to receive the peripheral portion of the tire, and the side wall of the tire also has a concavo-convex form to extend over the bulge in the side wall of the tire. The side wall of each section, as shown in the drawing, is terminated adjacent the rim. The said side wall, however, may be constructed so as to extend to the axis of the tire and rim.

Each of the cover sections 10 is pivoted to the supporting member 8 by means of a pivot pin 16 to swing in a plane substantially parallel with the central plane of the tire, or upon an axis substantially parallel with the axis of the tire. Each of these pins engages in a slot 18 in a projection on a bracket 20 secured to the corresponding cover section, and the ends of the pins engage in suitable openings in spaced projections 22 on the member 8 between which the projection on the bracket 20 is engaged. The slots 18 extend in a direction circumferentially of the sections to enable a relative movement to take place between the supporting member 8 and the adjacent ends of the cover sections in this direction when the device is applied to a tire and secured in operative position.

The sections 10 of the cover are arranged to project a short distance into the fender well when the device is applied to a tire, as clearly shown in Fig. 1. As shown in this figure, two contact members 24 and 26 are mounted in the fender well at the ends thereof for engagement with the lower ends of the sections 10 to hold said sections and the tire out of contact with the wall of the well. These contact members preferably consist of strips of flexible yielding sheet material such as impregnated fabric brake lining laid about the wall of the well.

In applying the combined cover and "hold-down" device to a tire, the supporting member 8 and the cover sections 10 are applied to the tire before the tire is placed in the fender well. In applying the structure to the tire the sections 10 are relatively expanded or moved away from each other to enable the peripheral walls of the section to be passed over the periphery of the tire and when the sections are in the proper transverse position with relation to the tire relatively contracted or brought together to engage the peripheral walls of the sections with the tire tread, the side walls of the sections engaging the side wall of the tire. The tire with the cover thus applied thereto is then placed in position in the fender well with the lower ends of the sections 10 engaging the contact members 24 and 26 and with the rod 12 engaging in the opening in the supporting member 8. The nut 14 is then threaded upon the upper end of the rod and is turned down against the supporting member, and is thereafter given a further actuation to force the tire cover and tire toward the fender well. During this operation the lower ends of the sections 10 are forced downwardly along the contact members 24 and 26 and thru the engagement of said sections with the inclined portions of said contact members, the sections are moved toward each other to force the same into firm engagement with the tire. Thus, by the actuation of the nut the sections 10 are finally forced firmly into engagement with said contact members, and the sections 10 are forced into engagement with the tire to hold the same securely in position. The slots 18 enable the upper ends of the sections 10 readily to adjust themselves to tires of different outside diameters, and also enable the said ends of the sections to move relatively toward each other to engage said sections firmly with the adjacent portions of the tire during the screwing down of the nut 14.

In removing the tire cover and "hold-down" device from a tire, the nut 14 is first unscrewed from the rod 12 and the tire with the supporting member 8 and sections 10 are removed from the fender well. The sections 10 are then swung relatively away from each other to enable them to be passed over the tire tread and the structure is removed from the tire.

In the construction shown in Figs. 5 and 6, the tire cover and "hold-down" device comprises tire cover sections 28 and a member 30, similar in construction respectively to the cover sections 10, and supporting member 8, shown in Figs. 1 to 4, inclusive. In the construction shown in Figs. 5 and 6, however, the cover sections 28 are not pivoted to the member 30 or otherwise attached thereto, but the adjacent ends of said sections are merely arranged to fit within said member in the manner shown in these figures. The member 30 is provided with an opening to receive a rod 32 mounted in the same manner as the rod 12, and a nut 34 is threaded upon the upper end of the rod to actuate said member 30; otherwise the device shown in Figs. 5 and 6 has substantially the same construction as the device shown in Figs. 1 to 4, inclusive.

In applying the structure shown in Figs. 5 and 6 to a tire, the sections 28 are first placed on the tire in substantially the positions shown in the drawing with the adjacent ends of said sections spaced a short distance apart, as shown in Fig. 5. The tire, with the sections applied thereto, is then placed within the fender well with the lower ends of said sections engaging the contact members 24 and 26. The member 30 is then placed in position over the periphery of the tire, so as to overlap the adjacent ends of the sections 28 and with the rod 32 engaging in the opening in said member. The nut 34 is then screwed down, thereby forcing the sections 28 firmly into engagement with the tire and also forcing the lower ends of said sections firmly into engagement with the contact members to hold the tire securely in position.

The constructions shown in the drawing not only form satisfactory covers for a tire, but also constitute efficient "push-down" or "hold-down" devices for holding the tire firmly and securely in the fender well. In each of the constructions shown, the tire is not only held firmly in the fender well from movement in the general direction of the plane thereof, but also is effectively held from lateral movement or vibration. The construction in each case is highly ornamental and attractive in appearance and forms an effective covering for the tire to protect the same from wind and dirt and exposure to the weather and also from injury from accidental contacts.

It is to be understood that the invention is not limited to the particular constructions and arrangements of parts of the illustrated embodiments of the invention, but that the invention may be embodied in other forms within the scope of the claims.

Having explained the nature and object of the invention, and having specifically described a construction embodying the invention in its preferred form, what is claimed is:

1. In combination with an automobile fender well for a spare tire, a spare tire cover construction comprising a rod mounted on the automobile and extending substantially parallel with the central plane of a tire supported in the well, a member mounted on said rod and movable thereon toward and from the axis of the tire, two relatively movable arcuate cover sections each arranged to extend from said member about the tire substantially to the fender well, and means carried by said member for engaging the adjacent ends of said cover sections and moving the same with said member.

2. In combination with an automobile fender well for a spare tire, a spare tire cover construction comprising a rod mounted on the automobile and extending substantially parallel with the central plane of a tire supported in the well, a member mounted on said rod and movable thereon toward and from the fender well, two relatively movable arcuate cover sections each arranged to extend from said member about the tire substantially to the fender well, and means connecting said member to said cover sections so that the sections and member are movable as a unit.

3. In combination with an automobile fender well for a spare tire, a spare tire cover construction comprising two relatively movable arcuate sections formed to extend partially about the outer periphery of a tire and into the mouth of the fender well so as to be freely movable out of the well in substantial parallelism to the median plane of the tire, means adjacent the upper part of the cover construction for supporting said sections adjacent the fender well, and means for holding the sections in proper tire protecting position.

4. In combination with an automobile fender well for a spare tire, a tire cover construction comprising two arcuate sections arranged to extend partially about a tire and to project into the fender wall and supported from a point over the top of the well, means for connecting the adjacent ends of said sections when applied to the tire, and yieldable means mounted at the mouth of the well for engaging the sections to hold the same in proper tire protecting position.

5. In combination with an automobile fender well for a spare tire, a tire cover construction comprising relatively movable tire cover sections having arcuate peripheral portions for covering portions of the periphery of a tire supported in the fender well, a clamp member connecting the adjacent ends of said sections and movable toward and from the fender well in a plane at substantially right angles to the said adjacent section ends so as to clamp said sections into, and release said sections from, cooperative relation to the fender well, and means for guiding said member in said movement when the cover is being placed in and removed from cooperative relation to the fender well.

6. In combination with an automobile fender well for a spare tire, a tire cover construction comprising two relatively movable arcuate tire cover sections extending from the fender well partially about the tire, means for connecting the adjacent ends of said sections, and means independent of said sections and constructed and arranged so as to support the first means for movement toward the fender well to clamp said sections and the tire in cooperative relation to the fender well and for movement from the fender well to remove the sections and tire from the fender well.

7. In combination with an automobile fender well for a spare tire, a tire cover construction comprising a clamp member movable toward and from the fender well, and tire cover sections extending from said member substantially to the fender well and arranged to be actuated by said member into and out of cooperative relation with the fender well.

GEORGE ALBERT LYON.